(12) United States Patent
Kuttenberger et al.

(10) Patent No.: US 10,782,697 B2
(45) Date of Patent: Sep. 22, 2020

(54) METHOD AND APPARATUS FOR MONITORING A STATE OF AN ELECTRONIC CIRCUIT UNIT OF A VEHICLE

(71) Applicant: Robert Bosch GmbH, Stuttgart (DE)

(72) Inventors: Alfred Kuttenberger, Weil der Stadt (DE); Bernd Mueller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 392 days.

(21) Appl. No.: 15/754,978

(22) PCT Filed: Jul. 20, 2016

(86) PCT No.: PCT/EP2016/067253
§ 371 (c)(1),
(2) Date: Feb. 23, 2018

(87) PCT Pub. No.: WO2017/032513
PCT Pub. Date: Mar. 2, 2017

(65) Prior Publication Data
US 2020/0225667 A1 Jul. 16, 2020

(30) Foreign Application Priority Data
Aug. 24, 2015 (DE) .......................... 10 2015 216 086

(51) Int. Cl.
*G06F 11/07* (2006.01)
*G05D 1/02* (2020.01)
(Continued)

(52) U.S. Cl.
CPC ....... *G05D 1/0214* (2013.01); *G06F 11/3013* (2013.01); *G06F 11/3495* (2013.01); *G05D 2201/0213* (2013.01); *G07C 5/02* (2013.01)

(58) Field of Classification Search
CPC ............ G06F 11/07; G06F 11/16; G06F 19/00
(Continued)

(56) References Cited

U.S. PATENT DOCUMENTS

| 8,813,208 B2 * | 8/2014 | Blot-Lefevre | G06Q 20/02 |
| | | | 709/227 |
| 9,015,093 B1 * | 4/2015 | Commons | B60W 30/00 |
| | | | 706/26 |
| 2012/0150651 A1 * | 6/2012 | Hoffberg | G06F 3/0482 |
| | | | 705/14.58 |

FOREIGN PATENT DOCUMENTS

| CN | 102686451 A | 9/2012 |
| CN | 102741818 A | 10/2012 |

(Continued)

OTHER PUBLICATIONS

International Search Report dated Oct. 10, 2016 of the corresponding International Application PCT/EP2016/067253 filed Jul. 20, 2016.

*Primary Examiner* — Tan Q Nguyen
(74) *Attorney, Agent, or Firm* — Norton Rose Fulbright US LLP; Gerard Messina

(57) ABSTRACT

A monitoring method includes: performing, by a first arithmetic and logic unit of an electronic circuit unit, a first processing rule to obtain a first processing result, performing, by a second arithmetic and logic unit of an electronic circuit unit, a second processing rule to obtain a second processing result, and, using a protection module of a safety area of the electronic circuit unit, identifying an error-free state of the electronic circuit unit in response to the first and second results having a predefined relationship to each other and/or the first and second results having a predefined relationship to a predefined criterion, where the protection module is configured to ensure that algorithms are carried out in a manner that is better protected from an incorrect (Continued)

execution than the first and second arithmetic and logic units.

18 Claims, 3 Drawing Sheets

(51) Int. Cl.
  *G06F 11/30* (2006.01)
  *G06F 11/34* (2006.01)
  *G07C 5/02* (2006.01)
(58) Field of Classification Search
  USPC .......................................................... 701/26
  See application file for complete search history.

(56) References Cited

FOREIGN PATENT DOCUMENTS

| | | |
|---|---|---|
| CN | 103676927 A | 3/2014 |
| DE | 4302483 A1 | 8/1994 |
| DE | 10007008 A1 | 9/2001 |
| DE | 102008021241 A1 | 10/2009 |
| DE | 102009001048 A1 | 8/2010 |

\* cited by examiner

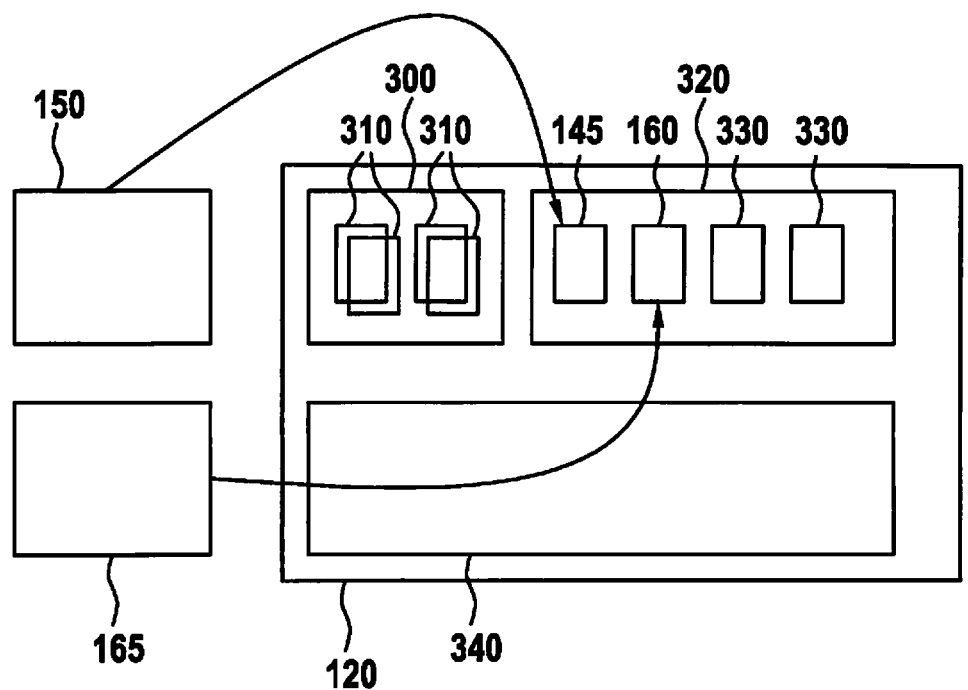

METHOD AND APPARATUS FOR MONITORING A STATE OF AN ELECTRONIC CIRCUIT UNIT OF A VEHICLE

CROSS-REFERENCE TO RELATED APPLICATIONS

The present application is the national stage of International Pat. App. No. PCT/EP2016/067253 filed Jul. 20, 2016, and claims priority under 35 U.S.C. § 119 to DE 10 2015 216 086.6, filed in the Federal Republic of Germany on Aug. 24, 2015, the content of each of which are incorporated herein by reference in their entireties.

BACKGROUND

In the automobile industry, ISO 26262 has been an important standard for functional safety since 2011. This standard formulates requirements for safety-relevant systems. An important class of requirements relates to coverages (as diagnostic coverage, single-point fault metric or latent fault metric) with regard to random hardware errors. Here, in order to provide a high degree of coverage for safeguarding cores within a µC, a dual-core lockstep can be provided. With suitable common cause measures, this measure is also appropriate and adequate for ASIL D.

In the driver assistance segment, very high computational power is required. Currently, no computers are commercially available that have the required computing power in a lockstep form. It is therefore difficult to safeguard against random hardware errors in the core at a level suitable for high ASIL. This problem is exacerbated by the fact that suitable safety measures also have to be present for caches and RAMs. Another challenge is that, in addition to the problems of functional safety that are considered exclusively in ISO 26262, there are additional safety problems: the question of whether an algorithm is adequately capable of fulfilling its task, for example recognizing pedestrians, is not addressed in ISO 26262. For this type of problem, often referred to as "functional inadequacy," an appropriate solution however also has to be found so that such a system can meet the user's safety expectations.

From DE 10 2009 001 048 A1, a device is known for testing the operation of a computer system having at least two processing units that operate in a first operating mode, in which the processing units execute different programs, or that operate in a second operating mode, in which the processing units execute identical programs, a changeover between the two operating modes taking place via a changeover signal issued to a changeover device.

SUMMARY

Against this background, the approach presented here presents a method for monitoring a state of an electronic circuit unit, as well as a device that uses this method, as well as, finally, a corresponding computer program.

According to an example embodiment of the present invention, a method for monitoring a state of an electronic circuit unit of a vehicle includes: carrying out a first processing rule on a first arithmetic and logic unit of the electronic circuit unit, in order to obtain a first processing result, and carrying out a second processing rule, differing from the first processing rule, on a second arithmetic and logic unit of the electronic circuit unit, in order to obtain a second processing result, the second arithmetic and logic unit being designed to carry out the second processing rule independently of the first arithmetic and logic unit; and recognizing an error-free state of the electronic circuit unit when the second processing result stands in a predetermined relation to the first processing result and/or to a predefined criterion, and/or if the first processing result stands in a predetermined relation to the second processing result and/or to the predefined criterion, the step of recognition being carried out in a safety area of the electronic circuit unit, the safety area of the electronic circuit unit having a protection module that is designed to ensure a carrying out of algorithms that is better protected against an incorrect execution than the first or second arithmetic and logic unit.

A monitoring of a state of an electronic circuit unit can be understood as the recognition of an incorrect operation of the electronic circuit unit. The electronic circuit unit can for example be an integrated circuit that has components that are housed in a common housing, or are even produced on the same production substrate, such as a semiconductor wafer. A processing rule can be understood as an algorithm or a sequence of operating commands for a computer or an automated computing system. An arithmetic and logic unit can be understood as any type of device that is designed to carry out and execute commands of an algorithm. For example, an arithmetic and logic unit can be a microcontroller, a digital signal processor, an FPGA, an ASIC, or some other CPU unit that can be loaded with a sequence of commands for carrying out the processing rule, or to which this processing rule has already been written in nonvolatile fashion. A processing result can be understood here as a numerical value or a set of individual results, for example a set of known objects and/or positions of such objects in a region around the vehicle. A predefined criterion can be understood for example as a threshold value or boundary value that is not to be exceeded, or, alternatively, is not to be undershot. A predetermined relation of the processing results can for example be understood as meaning that the first processing result is larger than, smaller than, or in particular equal to, or equal to within a tolerance range of for example 10%, the second processing result. In other words, this can mean that an absolute value of a difference between the first and second processing result is smaller than the width of the tolerance range.

A protective module can for example be understood as a double implementation of the corresponding circuit structure (for example computing cores) for carrying out operations in the safety area of the electronic circuit unit, an evaluation as error-free being made only when there is an identical result of the algorithms carried out on the two decision structures. The safety area of the electronic circuit unit can thus for example have a first computing core that is constructed analogously to an arithmetic and logic unit as named above, the protective module being for example a second computing core identical to the first computing core, on which an identical, for example parallel, execution of a computing or comparison algorithm takes place as on the first computing core. If the computing or comparison results resulting from the execution of the relevant computing or comparison algorithm on the first computing core and on the second computing core are then identical, or are at least equal within a tolerance range of 10%, then the computing results can be regarded as valid.

The approach proposed here is based on the recognition that through the execution of different processing rules on mutually independent arithmetic and logic units, an error in the hardware of at least one of the arithmetic and logic units can be recognized technically quickly and easily if the respective processing results of the processing rules carried out on the different arithmetic and logic units are compared to one another. Here the fact can be exploited that a predetermined relation of these processing results is already known ahead of time, or a particular processing result can be expected when a processing rule of an arithmetic and logic unit is carried out. This is advantageous in particular if the first and second processing rules differ from one another, i.e., if two different processing rules are executed on the respective first and second arithmetic and logic unit, or if the first processing rule differs from the second processing rule. The approach proposed here thus offers the possibility of monitoring a function or a state of the electronic circuit unit of the vehicle for freedom from error even in hardware environments that are standardly less secure against incorrect processing of the algorithms than a particular safety area of the integrated circuit or electronic circuit unit, but can nonetheless be used. This can in particular be exploited if a large number of safety-critical functions, such as vehicle steering functions or driver assistance functions in the vehicle, such as the engine controlling or transmission controlling or the triggering of an emergency braking, are to be monitored, for which purpose the numerical or circuit-related resources available in the safety area of the integrated circuit would not be sufficient, and for this purpose access would have to be made to a few secured areas of the integrated circuits or of the electronic circuit unit, which are generally already present in modern processors.

In an advantageous example embodiment of the approach presented here, in the step of carrying out, a first and second arithmetic and logic unit are used that are situated in a common housing of the electronic circuit unit, in particular the first and second arithmetic and logic unit being produced on and/or in a common production substrate. Such a specific embodiment of the approach presented here offers the advantage that different regions or computing cores of the electronic circuit unit, having corresponding arithmetic and logic units, can be used in parallel, in order nonetheless to ensure a high degree of safety functioning in the use of the electronic circuit unit.

Also advantageous is a specific embodiment of the approach presented here in which, in the step of carrying out, a first and/or second processing rule are used that implement a vehicle function and/or a driver assistance function, the vehicle function in particular implementing an engine controlling, a transmission controlling, and/or a controlling of personal protection means, and/or the driver assistance function implementing a recognition of a driving lane of a vehicle, a recognition of a pedestrian, and/or an evaluation of freedom from collision of a movement trajectory of a vehicle. A vehicle function can be understood in the present context as for example any control function of the vehicle, for example a controlling of a personal protection means such as an airbag or a reversible occupant restraint system, an engine controlling, or a transmission controlling. A driver assistance function can be understood as a function that supports a driver during activities that the driver could also carry out without the driver assistance function, but only with increased effort or increased attention. Such a specific embodiment of the approach presented here offers the advantage of a particularly reliable and secure recognition of the state of an electronic circuit unit that is to be used in the safety-critical region of the implementation of vehicle functions and/or driver assistance functions.

Also conceivable is a further specific embodiment of the approach presented here in which, in the step of carrying out, the first and second processing rule are designed to supply a first and second processing result that are equal within a range of tolerance, it then being recognized, in the step of the recognition of the error-free state of the electronic circuit unit, when the first processing result is equal to the second processing result within the tolerance range. Here, a tolerance range can for example be understood as meaning that the first processing result differs from the second processing result by not more than 10%. Such a specific embodiment of the approach presented here offers the advantage that, through a diversified calculation of the first and second processing result in the first and second processing rule, it is technically very simple to monitor the correct functioning of the first and second arithmetic and logic unit. Here, for example in the first processing rule the sequence of processing commands can be modified relative to the sequence of processing commands in the second processing rule. In this way, the correct operation of the first and second arithmetic and logic unit can be monitored very easily.

According to a further specific embodiment of the approach proposed here, in the step of carrying out the second processing rule can be applied to the first processing result, the error-free state of the electronic circuit unit being recognized in the step of recognition if the second processing result corresponds to an initial value that leads to the first processing result when the first processing rule is applied. Such a specific embodiment of the approach proposed here offers the advantage that through the second processing rule an inverse function or operation of the function or operation brought about by the first processing rule can take place, such that in some situations, through a "back and forth calculation" by the first and second processing rule, a monitoring of the correct functioning of the first and second arithmetic unit can take place that is very simple numerically or in terms of circuitry.

Also advantageous is a further specific embodiment of the approach proposed here in which, in the step of carrying out, the second processing rule is applied to the first processing result, the second processing rule being designed for the filtering of the first processing result. Such a processing rule also offers the advantage of a technically very simple realization of the design proposed here. In particular, the filtering can be understood as a reduction of a set of individual results in the corresponding processing result, for example in which the filtered-out and discarded individual results do not meet a filter criterion.

Particularly advantageous is a specific embodiment of the approach proposed here in which the steps of carrying out and recognition are carried out repeatedly, such that, in a subsequently executed step of carrying out, the first processing rule is carried out on the second arithmetic and logic unit and the second processing rule is carried out on the first arithmetic and logic unit, or on a third arithmetic and logic unit, different from the first and second arithmetic and logic unit, of the electronic circuit unit. Through the rotation of the carrying out of corresponding processing rules on different arithmetic and logic units, such a specific embodiment of the approach proposed here offers the possibility of very precise recognition of hardware errors in the corresponding individual arithmetic and computing units.

A further specific embodiment of the approach proposed here for the highly precise recognition of the state of the electronic circuit unit can be implemented in that, in the step of carrying out, the first and second processing rule are applied to different initial data in order to obtain the first and second processing result. Here, initial data can be understood as a start value used as an initial value for the processing in the first and second processing rule.

Also advantageous is a specific embodiment of the approach proposed here in which for the execution of the step of recognition a lower computing power is required than for an execution of the step of carrying out. Such a specific embodiment of the approach presented here offers the advantage of a particularly resource-efficient use of the available computing power, such that incorrect operation of the electronic circuit unit can nonetheless be recognized with a high degree of certainty.

The methods presented here can be implemented for example in software or hardware, or in a mixed form of software and hardware, for example in a control device.

The approach presented here also provides a device that is designed to carry out, control, or realize the steps of a variant of a method presented here in corresponding devices. Objects of the present invention can be achieved quickly and efficiently through this variant embodiment of the present invention in the form of a device as well.

In the present context, a device can be understood as an electrical apparatus that processes sensor signals and outputs control and/or data signals as a function thereof. The device can have an interface that can be realized as hardware and/or as software. In the case of a realization as hardware, the interfaces can for example be part of a so-called system ASIC that contains a wide variety of functions of the device. However, it is also possible for the interfaces to be separate integrated circuits, or to be made up at least in part of discrete components. In the case of a realization as software, the interfaces can be software modules present on a microcontroller alongside other software modules.

Also advantageous is a computer program product or computer program having program code that can be stored on a machine-readable carrier or storage medium such as a semiconductor memory, a hard drive memory, or an optical memory, and can be used to carry out, realize, and/or control the steps of a method according to one of the specific embodiments described above, in particular when the program product or program is executed on a computer or on a device.

Exemplary embodiments of the present invention are shown in the drawings and are explained in more detail in the following description.

BRIEF DESCRIPTION OF THE DRAWINGS

FIG. 4 is a schematic diagram of an electronic circuit unit for use in an example embodiment of the present invention.

DETAILED DESCRIPTION

Figure 1:
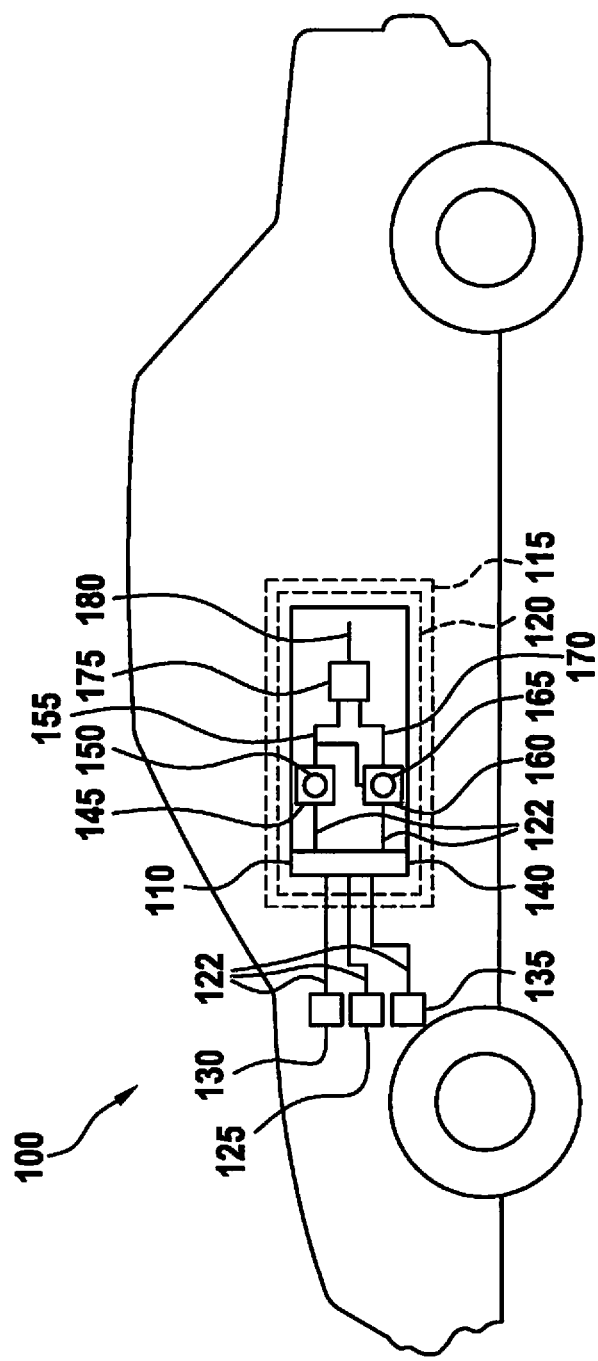
FIG. 1 is a schematic diagram of a vehicle having a device according to an example embodiment of the present invention.

In the following description of advantageous exemplary embodiments of the present invention, identical or similar reference characters are used for elements shown in the various figures and having similar function, and repeated description of these elements is omitted.

FIG. 1 shows a schematic diagram of a vehicle 100 in which a device 110 according to an example embodiment of the present invention. Vehicle 100 includes for example a driver assistance system 115 having an electronic circuit unit 120 for enabling various driver assistance functions to be carried out, such as the recognition of a driving lane of vehicle 100, the recognition of a pedestrian in front of or next to vehicle 100, or the evaluation of the freedom from collision of a vehicle trajectory relative to an object in this vehicle trajectory of vehicle 100. However, here it is particularly important to ensure the error-free functioning of this driver assistance system 115, or of electronic circuit unit 120 that carries out the functions of driver assistance system 115. In particular, it is to be avoided that malfunctions, for example due to hardware errors in electronic circuit unit 120 of this driver assistance system 115, are caused that would have serious consequences for the driving safety of vehicle 100. For example, such a malfunction could result in an erroneous emergency braking of vehicle 100, which could cause a risk of injury to the vehicle occupants and/or a risk of collision with a vehicle traveling behind. In modern control devices or execution units for the algorithms of the driver assistance functions, circuit structures are indeed already present having particular safeguards against malfunctions, but the increasing automation of driving functions or assistance functions creates an increased need for such secured circuit structures. In order to meet this requirement, circuit units could indeed be used that have a larger number of such secured circuit structures, for example twice the number of corresponding computing cores, but this would cause an increased outlay for the circuits to be used and therefore for the implementation of these driver assistance functions.

Analogously, in many vehicles 100, one or more electronic circuit units are also implemented that carry out vehicle functions such as engine or transmission control functions, or the controlling of personal protection means such as airbags or pedestrian protection systems. For such electronic circuit units as well, analogously to the problems cited above concerning the high degree of safety in driver assistance systems, it has to be ensured that these electronic circuit units operate without error, so that here as well a special safety architecture is to be used.

Compared to the use of such circuit units having such a larger number of secured circuit structures, in the approach proposed here a path is shown indicating how, with a conventional electronic circuit unit 120, a similarly secure functioning of driver assistance system 115, or of a corresponding vehicle control system, can be ensured through a very advantageous monitoring of the state of electronic circuit unit 120. Such a monitoring of the state of electronic circuit unit 120 can take place for example by reading data 122 from one or more sensors, such as an acceleration sensor 125, a pressure sensor 130, or a radar sensor 135, into device 110 for monitoring the state of electronic circuit unit 120, via a read-in interface 140. These data 122, or a portion of these data 122, can then be processed in a first arithmetic and logic unit 145, using a first processing rule 150, in order to obtain a first processing result 155. First processing rule 150 can be a specific algorithm or a sequence of commands by which data 122 or a portion of these data 122 are processed.

First processing result 155 can here be a concrete value, or also a set of values, representing for example objects or their positions in space around vehicle 100.

Analogously, data 122, a portion of these data 122, or first processing result 155 can be transferred into a second arithmetic and logic unit 160, in which a second processing rule 165 is applied to these data 122 or to first processing result 155 in order to obtain a second processing result 170. Here, first arithmetic and logic unit 145 should operate independently of second arithmetic and logic unit 160, i.e., the carrying out of commands in first arithmetic and logic unit 125 should be independent of states or carried-out commands in second arithmetic and logic unit 160. Here as well, second processing rule 165 can be a specific algorithm or a sequence of commands by which data 122, or a portion of these data 122, are processed. Second processing result 170 can again be a concrete value or a set of values that for example represent objects or their positions in space around vehicle 100. In a recognition unit 175, first processing result 155 and/or second processing result 170 can now be used to recognize the error-free state of electronic circuit unit 120. Recognition unit 175 is situated in a safety area of electronic circuit unit 120, the safety area of electronic circuit unit 120 having a protection module that is designed to ensure a carrying out of algorithms that is better protected against incorrect execution than first 145 or second arithmetic and logic unit 160.

This recognition of the error-free state of electronic circuit unit 120, outputted for example as signal 180, can for example take place when second processing result 170 stands in a predetermined relation to first processing result 155 and/or to a predefined criterion, such as a threshold value. Alternatively or in addition, the error-free state of electronic circuit unit 120 can be recognized when first processing result 155 stands in a predetermined relation to second processing result 170 and/or to a predefined criterion such as a threshold value. For example, first processing result 155 and/or second processing result 170 can be greater than, smaller than, equal to, or equal to within a determined tolerance range of for example 10%, such a threshold value as the predefined criterion for recognizing the error-free state of the electronic circuit unit.

Figure 2:
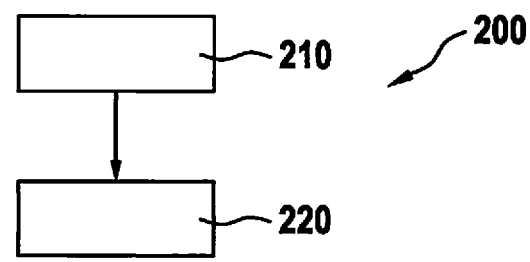
FIG. 2 is a flowchart illustrating a method according to an example embodiment of the present invention.

FIG. 2 is a flowchart of a method 200 according to an example embodiment of the present invention for monitoring a state of an electronic circuit unit of a vehicle. Method 200 includes a step 210 of carrying out a first processing rule on a first arithmetic and logic unit of the electronic circuit unit in order to obtain a first processing result, and carrying out a second processing rule, different than the first processing rule, on a second arithmetic and logic unit of the electronic circuit unit in order to obtain a second processing result, the second arithmetic and logic unit being designed to execute the second processing rule independently of the first arithmetic and logic unit. In addition, method 200 includes a step 220 of recognizing an error-free state of the electronic circuit unit when the second processing result stands in a predetermined relation to the first processing result and/or to a predefined criterion, and/or when the first processing result stands in a predetermined relation to the second processing result and/or to the predefined criterion, step 220 of recognition being executed in a safety area of the electronic circuit unit, the safety area of the electronic circuit unit having a protection module that is designed to ensure a carrying out of algorithms that is better protected against incorrect execution than the first or second arithmetic and logic unit.

The approach proposed here thus offers an advantageous possibility for realizing an improved safety design for driver assistance systems. With this, a design is proposed that simultaneously provides appropriate control of functional inadequacies and a hardware safeguarding.

In the course of the safety analysis of an application function, sub-functions of driver assistance system 115 are identified that have to be reliably provided. In the approach presented here, these sub-functions are designated as different processing rules or as DSF (design safety functions) that are to function particularly reliably in order to avoid causing any risk to vehicle occupants or persons or objects outside vehicle 100. Particular example of such processing rules or DSFs can include: recognition of the driving lane of vehicle 100, recognition of pedestrians outside vehicle 100, and evaluation of freedom from collision of a travel trajectory of vehicle 100.

In order to control functional inadequacies in the realization of a DSF, it often makes sense, in the algorithmic realization of the DSF, to use (at least) two different parts DSF_1 and DSF_2, each of which makes a contribution. Here, for example the first processing rule 150 can be designated or understood as first part "DSF_1" and second processing rule 165 as second part "DSF_2" according to the above description. Only when both contributions fail does there then occur a critical system error of electronic circuit unit 120. This can be realized for example as follows:

Diversified calculation, i.e., calculation in two different ways. In this case, DSF_1 150 and DSF_2 165 have essentially the same task. Processing rules 150, or 165, should thus result in an at least substantially identical result even when the sequence or structure of the commands of the processing rules has changed;

Test routine: the result of one part is plausibilized by the other. For example, first processing result 155 of first processing rule DSF_1 can be plausibilized by second processing result 170 from DSF_2. Such a procedure offers the advantage that, for example given a realization of first processing rule 150 that has a high outlay numerically or in terms of circuitry, the first processing result can be checked significantly more easily if a very simple inverse operation is applied to this expensive first processing rule 155 as second processing rule 165; or Downstream filter: second processing rule 165, or DSF 2, can also further process first processing result 155, filtering out errors of first processing rule 150, or DSF 1.

There are also additional forms, including mixed forms. The form of the algorithmic difference and the interplay is not further considered here, but is also not excluded by the approach presented here.

It is important that there are (at least) two parts, which are intended to show failure behavior that is as independent as possible, and are thus to the greatest possible extent to be carried out on two different arithmetic and logic units 145 or 160, or computing cores. It is advantageous for these two parts to run on different cores, if possible also with different caches, and even separate RAM areas.

A main advantage of the approach presented here is that it makes it possible to use mechanisms that are introduced for the control of functional inadequacies, such as the introduction of a plurality of sub-functions DSF_1 and DSF_2, for hardware safeguarding as well, because in this way in some circumstances it is possible to augment high degrees of coverage for the core, cache, and RAM protection.

Figure 3:
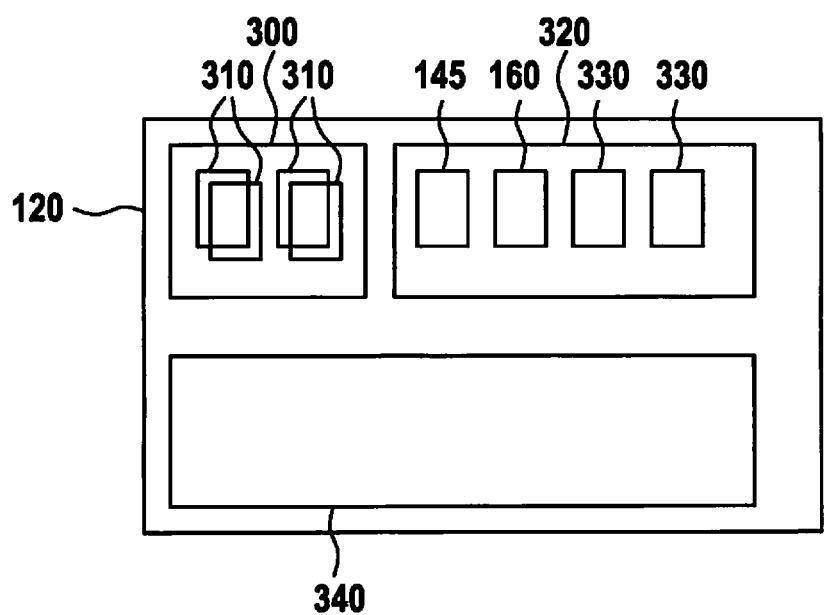
FIG. 3 is a schematic diagram of an electronic circuit unit for use in an example embodiment of the present invention.

A schematic diagram of a possible hardware architecture of a high-performance chip, or of a corresponding electronic circuit unit 120, for driver assistance and highly automated systems is shown in FIG. 3.

In the chip, or electronic circuit unit 120, there is a "safe island," i.e., a secured computing platform as safety area 300 of electronic circuit unit 120, containing one or more hardware-protected cores or computing cores 310. Such a safeguarding can for example take place through a safety module that provides a doubling of the corresponding computing cores 310, and assumes an error-free execution of this processing rule only when a processing rule carried out identically on both computing cores 310 yields identical results. Preferably, these computing cores 310 are realized for example as lockstep computing units. This computing platform, or safety area 300, is in the best case an ASIL D-capable platform that, in addition to the cores 310 used, also protects the caches used here. It is not to be expected that the overall computing power required for the corresponding functions named above, such as driver assistance or vehicle functions such as engine controlling or personal restraint means controlling, can be provided on this safe island 300. Therefore, there is a computing power zone 320 that has a plurality of very powerful cores, which can for example be designated first arithmetic and logic unit 145, secondary arithmetic and logic unit 160, or additional arithmetic and logic units 330. On the chip, there are also further components 340 (e.g., communication, I/O, pre-processing, . . . ), which however are not of further relevance here, and therefore are not described in more detail.

The DSF or processing rules that are not executed on safe island 300 are to be processed, in some circumstances, in components 320 of computing power zone 320. This takes place in such a way that the components, or processing rules DSF_1 and DSF_2 of the DSF, are distributed to two different cores, or arithmetic and logic units 145 and 160, of computing power zone 320, or are loaded onto these arithmetic and logic units for execution, as is shown in the schematic representation of FIG. 4. Thus, DSF_1 150 and DSF_2 165 cannot be influenced directly by the same hardware errors in one of the cores 145 or 160; in particular, an influence of the same type is sufficiently improbable. Typically, each of the cores 145, 160, or 330, has its own L1 cache. For this cache, this method thus in addition produces a protection argument (relating to the DSF). Of course, it is nonetheless advantageous if the L1 cache is additionally protected by suitable measures (e.g., parity, ECC, tag protection, reencoding, . . . ). A common cause analysis should of course be carried out specific to the application. This can result in further requirements, whose fulfillment can increase the independence of the two parts. For example, it is possible for different libraries to be used so that L2 cache errors cannot have any direct effects.

In principle, it makes sense to provide tests of cores 145, 160, or 330 that are as powerful as possible. If possible, these should be hardware-supported BIST (built-in self-tests), but a software solution is also conceivable. Depending on the frequency of occurrence of a difference between the two variants due to functional inadequacies, it is possible also to activate a test in a targeted manner when a difference has been determined. If adequate cores and computing power are present, then a cross-comparison with a redundantly operating "spare" core can also be regarded as a test. The combination of the two partial results of DSF_1 and DSF_2 should preferably take place through the safe island or unit(s) 310 in safety area 300, which are in particular protected against a faulty algorithmic execution. If an architecture not having a safe island 300 is chosen, then the combination can also be implemented on each of the two cores, in which case it must however be ensured that individual errors do not have an effect on both cores 145 and 160.

The respective first and second processing rule 150 or 165 can be loaded into first or second arithmetic and logic unit 145 and 160 by device 110 (not shown in FIGS. 3 and 4) for monitoring. The evaluation or recognition of the error-free state of electronic circuit unit 120 on the basis of the first and/or second processing result 155 or 170 can be carried out in a corresponding unit 175, which in some exemplary embodiments can be formed by computing cores 310 of the safety area, but which can also be implemented by units not shown in FIGS. 3 and 4.

It is clear that the presented method can also be expanded to three or more components. A voting, and thus an error tolerance layer, can then be provided if warranted.

As an expansion, it can be an advantageous option to periodically change the cores used. For example, in one cycle the pair (DSF 1, DSF_2) can be calculated on the core C1, C2, or 145 and 160. In the next cycle this can be done on (C2, or 160, and C3, or 330), etc., up to (Cn, C1). A cycle size (from system period to driving cycle) that is still manageable in its software complexity is to be defined in the individual case. In principle, it is advantageous if the parts (DSF_1, DSF_2) differ even in their input data 122. It is optimal, in the sense of robustness, if different (as diversified as possible) sensor data are used. However, this is not necessary.

If an exemplary embodiment includes an "and/or" linkage between a first feature and a second feature, this is to be read as meaning that according to one specific embodiment the exemplary embodiment has both the first feature and the second feature, and according to another specific embodiment the exemplary embodiment has either only the first feature or only the second feature.

The invention claimed is:

1. A method for monitoring a state of an electronic circuit unit of a vehicle, the method comprising:
   carrying out a first processing rule to obtain a first processing result;
   carrying out a second processing rule that is different than the first processing rule, to obtain a second processing result; and
   using a protection module of a safety area of the electronic circuit unit, identifying an error-free state of the electronic circuit unit in response to at least one of:
   the second processing result having a predefined relationship to the first processing result;
   the second processing result having a predefined relationship to a predefined criterion;
   the first processing result having a predefined relationship to the second processing result; and
   the first processing result having a predefined relationship to a predefined criterion;
   wherein:
   the carrying out of the first processing rule is at least initially by a first arithmetic and logic unit of the electronic circuit unit;
   the carrying out of the second processing rule is at least initially by a second arithmetic and logic unit of the electronic circuit unit;
   the second arithmetic and logic unit is configured to carry out the second processing rule independently of the first arithmetic and logic unit; and
   the protection module is configured to ensure that algorithms are carried out in a manner that is better protected from an incorrect execution than the first and second arithmetic and logic units.

2. The method of claim 1, wherein the first and second processing rules, when carried out, are designed for the obtained first and second processing results to equal each other within a tolerance range, the error-free state being identified responsive to a determination that the obtained first and second processing results equal each other within the tolerance range.

3. The method of claim 1, wherein the second processing rule, when carried out, is applied to the first processing result, and the error-free state is identified responsive to a determination that the second processing result corresponds to an initial value that produces the first processing result when the first processing rule is applied.

4. The method of claim 1, wherein the second processing rule, when carried out, is applied to, and is configured to filter, the first processing result.

5. The method of claim 1, wherein the steps of carrying out the first and second processing rules and of identifying the error-free state are performed repeatedly, such that after a first performance of the carrying out of the first and second processing rules, in a subsequent performance of the carrying out of the first and second processing rules, the first processing rule is carried out by the second arithmetic and logic unit and the second processing rule is carried out by the first arithmetic and logic unit or a third arithmetic and logic unit of the electronic circuit unit.

6. The method of claim 1, wherein the first and second processing rules are applied to different initial data in order to obtain the first and second processing results.

7. The method of claim 1, wherein a lower computing power is required for the identification of the error-free state than for the carrying out of the first and second processing rules.

8. The method of claim 1, wherein the first and second arithmetic and logic units are produced on or in a common production substrate are situated in a common housing of the electronic circuit unit.

9. The method of claim 1, wherein the carrying out of at least one of the first and second processing rules implements a vehicle function.

10. The method of claim 1, wherein the carrying out of at least one of the first and second processing rules implements a driver assistance function.

11. The method of claim 1, wherein the carrying out of at least one of the first and second processing rules implements a vehicle function that controls an engine.

12. The method of claim 1, wherein the carrying out of at least one of the first and second processing rules implements a vehicle function that controls a transmission.

13. The method of claim 1, wherein the carrying out of at least one of the first and second processing rules implements a vehicle function that controls a personal protection device.

14. The method of claim 1, wherein the carrying out of at least one of the first and second processing rules implements a driver assistance function that recognizes a driving lane of a vehicle.

15. The method of claim 1, wherein the carrying out of at least one of the first and second processing rules implements a driver assistance function that recognizes a pedestrian.

16. The method of claim 1, wherein the carrying out of at least one of the first and second processing rules implements a driver assistance function that evaluates a freedom from collision of a movement trajectory of a vehicle.

17. A vehicle system comprising:
an electronic circuit unit that includes:
a first arithmetic and logic unit;
a second arithmetic and logic unit; and
a safety area that includes a protection module;
wherein:
the vehicle system is configured to perform a method comprising:
carrying out a first processing rule to obtain a first processing result;
carrying out a second processing rule that is different than the first processing rule, to obtain a second processing result;
using the protection module, identifying an error-free state of the electronic circuit unit in response to at least one of:
the second processing result having a predefined relationship to the first processing result;
the second processing result having a predefined relationship to a predefined criterion;
the first processing result having a predefined relationship to the second processing result; and
the first processing result having a predefined relationship to a predefined criterion;
the carrying out of the first processing rule is at least initially by the first arithmetic and logic unit of the electronic circuit unit;
the carrying out of the second processing rule is at least initially by the second arithmetic and logic unit of the electronic circuit unit;
the second arithmetic and logic unit is configured to carry out the second processing rule independently of the first arithmetic and logic unit; and
the protection module is configured to ensure that algorithms are carried out in a manner that is better protected from an incorrect execution than the first and second arithmetic and logic units.

18. A non-transitory computer-readable medium on which are stored instructions that are executable by a processor and that, when executed by the processor, cause the processor to perform a method for monitoring a state of an electronic circuit unit of a vehicle, the method comprising:
carrying out a first processing rule to obtain a first processing result;
carrying out a second processing rule that is different than the first processing rule, to obtain a second processing result; and
using a protection module of a safety area of the electronic circuit unit, identifying an error-free state of the electronic circuit unit in response to at least one of:
the second processing result having a predefined relationship to the first processing result;
the second processing result having a predefined relationship to a predefined criterion;
the first processing result having a predefined relationship to the second processing result; and
the first processing result having a predefined relationship to a predefined criterion;
wherein:
the carrying out of the first processing rule is at least initially by a first arithmetic and logic unit of the electronic circuit unit;
the carrying out of the second processing rule is at least initially by a second arithmetic and logic unit of the electronic circuit unit;
the second arithmetic and logic unit is configured to carry out the second processing rule independently of the first arithmetic and logic unit; and
the protection module is configured to ensure that algorithms are carried out in a manner that is better protected from an incorrect execution than the first and second arithmetic and logic units.

* * * * *